Aug. 3, 1943.   H. B. DENMAN   2,325,594
SHEET METAL SOUND DAMPING MATERIAL
Filed Dec. 14, 1937

Inventor
Harry B. Denman
By Ashman Darby & Ashman
Attorneys

Patented Aug. 3, 1943

2,325,594

UNITED STATES PATENT OFFICE 2,325,594

SHEET METAL SOUND DAMPING MATERIAL

Harry B. Denman, Detroit, Mich., assignor to Detroit Gasket & Mfg. Co., Detroit, Mich., a corporation of Michigan Application December 14, 1937, Serial No. 179,799

2 Claims. (Cl. 154—44)

The present invention relates to a structural element for damping sound. It is particularly useful in connection with motor vehicle bodies where vibration incident to the operation of the motor and the travel of the vehicle frequently creates objectionable noise and metallic sounds.

The material not only restrains or damps the vibrations, but is likewise sound absorbing. The term "sound deadening" as used subsequently in the specification, is therefore intended to include a material which has both of these functions, namely, damping and sound absorption.

A primary object of the present invention is to provide a sound damping material which is capable of rapid and simple application to the part to be damped and which will be firmly adhered in a manner to assure a permanent union unaffected by the wide variation in temperatures and climatic conditions to which the body is subjected.

Heretofore, the adhesive for positioning damping material has been rendered tacky by means of a solvent. Such procedure is objectionable because of the fire hazard it creates, and also because of the possibility of injury to the health of the workman through inhaling the volatile solvent.

Another method has been to use a composition, e. g., a mixture of asphalt and asbestos and apply the same in a spreadable state. The difficulties with this method are the tendency of the flowable mass to drop off before it can be cooled and hardened, whence the final covering is not uniform; also, the adherence of the composition is not reliable in that under the varying temperatures which are normally encountered, the composition loosens and falls away so as to lose its effectiveness.

Applicant's improved damping material consists of a porous, self-sustaining base layer having, as required, a varying flexibility and thickness. The adhesive is applied upon one side of the base, preferably as a porous layer consisting of a mixture of a thermo-plastic material and a filler. The porous nature of the material assures that it will have desirable sound absorbent qualities. An important characteristic of the thremo-plastic adhesive, is its relatively high melting point when hardened, e. g., about 180° F. to 250° F. whereby it is not affected or softened by temperatures incidental to the use of the automobile. Another important quality of the adhesive composition layer is its porosity and the ability with which it can be built up to any desired thickness so as to constitute the sound deadening layer either alone or in cooperation with the base layer, the composition being of any desired thickness and controlled flexibility. In some cases, the use of fillers is omitted and a thin film of the thermo-plastic adhesive is coated upon the base layer which latter is of a structure to act as the damping means.

A particular object of the invention is to provide a damping material which may be applied to a preheated body or other part to be damped or which, may be positioned on the body or part to be damped and thereafter the assembly subjected to heating. In either case, the temperature is sufficiently high to render the thermo-plastic adhesive tacky, thereby eliminating the use of a solvent or a flowable composition. For example, the damping material is positioned on the body, and then as the automobile body passes through the enamel baking ovens a temperature sufficiently high is reached to render the adhesive composition adherent and unite the damping board to the body. The damping board may be pressed, if necessary, upon the heated area as the body emerges from the oven. Instead of applying the damping board and then heating the part to be damped, e. g., the door or panel may be preheated and the damping board then applied and united by simply pressing it upon the heated area. A firm and permanent union is effected, and as stated, the adhesive after hardening does not break down or disintegrate under the normal conditions encountered in the use of the vehicle.

Before explaining in detail the present invention, it is to be understood that the invention is not limited in its application to the details of construction and the method illustrated in the accompanying drawing, since the invention is capable of other embodiments and of being practiced or carried out in various ways. Also, it is to be understood that the phraseology or terminology employed herein is for the purpose of description and not of limitation, and it is not intended to limit the invention claimed herein beyond the requirements of the prior art. In this connection also, while I have indicated the damping material as adapted particularly for automotive use, it is capable of application in any instance where sound deadening is desired.

Referring to the drawing.

Figure 1:
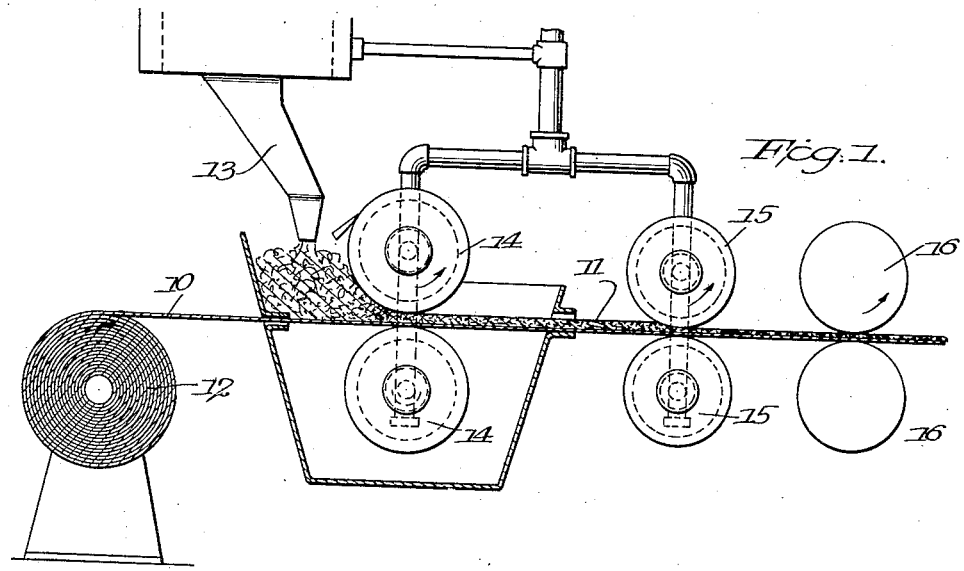
Figure 1 is a diagrammatic view showing one method of preparing the improved damping material.
Figure 2:
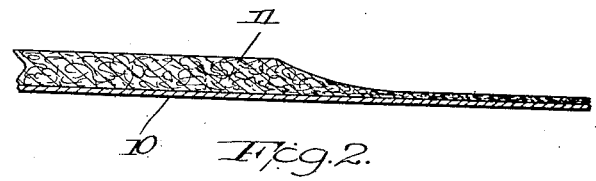
Figure 2 is an enlarged sectional view showing the laminated or coated material after the first rolling operation.
Figure 3:
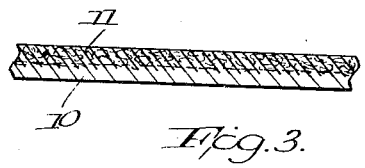
Figure 3 is an enlarged sectional view of the final product.

Referring to Figures 2 and 3, the damping material is a board-like product and consists of a base layer 10 and an adhesive layer 11. The base layer may be formed of any suitable material, for example, paper, cloth, felt, burlap or metal screen and will possess the required amount of flexibility and porosity for the particular place to be damped. In some cases, the base layer is relatively thin, that is, it forms simply a sustaining means or backing, while the adhesive layer has the required porosity and thickness to constitute the sound deadening member. Also, both the base layer and the adhesive layer are in some cases formed to exert a sound deadening or damping effect in cooperation with each other. This latter product is indicated in Figure 3.

The adhesive layer 11 is preferably a mixture of the thermo-plastic adhesive with a suitable filler. The melting point of the thermo-plastic adhesive is a critical consideration. I preferably employ an adhesive which does not break down or melt under the temperatures normally encountered in the use of the vehicle, i. e., having a melting point between substantially 180° F. and 250° F. "Standard Oil Soft Parolite" is a good example of thermo-plastic adhesive because it is both cheap and meets the requirements as to thermo-plasticity. Other adhesives, such as asphalts having a required critical melting point however, are commercially available and may be used. The fillers may be any waste material, for example, asbestos, waste paper, clay, which are preferably suitably ground, and, in fact, a large variety of products. In the case of clay, a suitable clay is, of course, selected which will contribute to the porous nature of the composition. A preferred mixture comprises two-thirds adhesive and one-third filler by volume, e. g., two-thirds "Parolite" and one-third ground asbestos.

With respect to the flexibility of the laminated or coated damping element, this may vary from a relatively stiff condition to extreme flexibility in accordance with the particular area to be damped. As explained, the damping member may be either the base layer or the adhesive layer or both. In some cases, the base layer will constitute the damping member and a relatively thin film-like coating of the adhesive will be applied thereto.

The relative thickness of the base layer and adhesive composition layers may be varied to exert the desired sound deadening effect. In a preferred example, the base layer will be of greater thickness than the adhesive composition layer, but, as previously stated, the adhesive composition layer may be of greater thickness than the base layer or the two may be of equal thickness, all depending upon the damping conditions.

The final product consists of the base layer 10 which has a substantially smooth uncoated outer surface and the adhesive layer 11 having its exposed surface in non-tacky state.

In the manufacture of the board, the base material is fed from a roll 12 to a point beneath the discharge spout 13 from which is deposited upon the continuously moving base strip a suitable fluid, somewhat plastic or dry mixture of adhesive and fillers to form a layer of adhesive composition upon the base layer. The mixture is compressed and spread upon the base layer by the heated rolls 14 and further compressed and uniformly spread by the rolls 15 which may or may not be heated. Thereafter, the laminated or coated product is given a further compressing and spreading action by the cold rolls 16. In this manner, the board is reduced to the required final thickness and the adhesive is rendered non-tacky. In this condition, the board or a roll thereof may be shipped and stored without danger of deterioration of the adhesive layer and the damping material is ready for immediate application.

In Figure 2, I have illustrated in a somewhat enlarged view, the condition of the layers before and after passing through the heated rolls 15. Rolls 14, 15 and 16, of course, may be adjusted so as to compress the adhesive composition to any required thickness whereby its density may be controlled to afford the desired sound deadening qualities.

In Figure 3, I have illustrated a board wherein the base layer 10 and the adhesive composition layer 11 are substantially equal in thickness. In this construction, the base layer 10 may be simply employed to sustain the layer 11, the latter acting as the sound deadening member. Also, the layers 10 and 11 may both cooperate to exert the damping effect. It will be noted that the adhesive composition permeates into the fibrous or open base layer assuring an integral union between the two layers at their contact surfaces.

Figure 4:
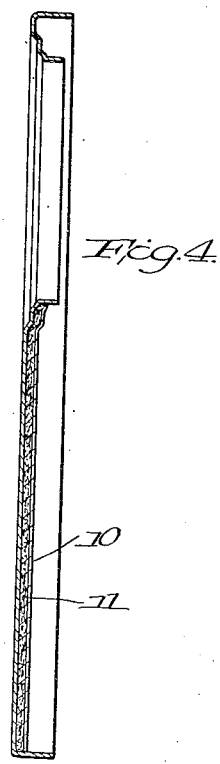
Figure 4 is a sectional view showing the damping material applied to a door.

In Figure 4, I have shown solely for purposes of illustration an automobile door frame with the sound damping board of this invention applied thereto. The manner of application of the board is of particular importance.

One method of application consists in pressing the board upon a vehicle body or other part such as a door or panel while the same has a high temperature, e. g., a temperature sufficient to render the adhesive tacky and adhesive. This preheating temperature may, in some cases, be greater than temperatures usually present in an enamel oven. I have discovered that the temperature of the automobile body and of the usual enamel drying ovens is generally sufficient to render the adhesive tacky, and therefore the board may be simply applied by placing the adhesive side upon the surface of the area of the body or part to be damped, and then the assembly passed through the oven, whereupon the adhesive is rendered tacky and adherent to unite the damping board to the part to be damped. If desired, the board may be pressed on the area to be damped as it leaves the oven. The use of solvents or flowable compositions is thus eliminated since the thermo-plastic adhesive is immediately rendered tacky by preheating the area of the body to be damped or heating the part to be damped and the damping board simultaneously. As the body cools, which is relatively rapid, the adhesive hardens and a firm and permanent union of the damping board with the body is secured. As heretofore stated, the adhesive employed is one having a relatively high melting point so that it is not subject to conditions of elevated temperature which are liable to be encountered in the normal use of the vehicle. Hence, there is no danger of the board becoming loosened. Moreover, the adhesive does not congeal or disintegrate in the presence of low temperatures.

It is to be understood that the product of the present invention may be of any desired shape or form and will be made of varying sizes or in strips, as required.

Further, it is to be noted that one may either apply the damping material to a previously heated surface, or the damping board may be applied to a surface which may thereafter be suitably heated.

The cooling of the adhesive after the damping board has been applied may take place in the atmosphere or by some positive cooling means.

I claim:

1. Sound damping and sound absorbing material for adhesive connection to bodies of automotive vehicles, said material forming a permanent union therewith unaffected by temperature and climate conditions to which said bodies are subjected, said material comprising a self-sustaining fabricated layer and a thermoplastic asphaltic adhesive, porous, layer superimposed thereon and rendered tacky and adherent upon application of heat, said thermoplastic adhesive having a melting point between substantially 180° and 250° F. and being unaffected or softened by temperatures incidental to the use of an automobile, the porous layer essentially including the adhesive and a filler selected from the group consisting of fibers and clay with the adhesive substantially twice the volume of the filler.

2. Sound damping and sound absorbing material for adhesive connection to bodies of automotive vehicles, said material forming a permanent union therewith unaffected by temperature and climatic conditions to which said bodies are subjected, said material comprising a self-sustaining fabricated layer and a thermoplastic asphaltic adhesive porous layer superimposed thereon and rendered tacky and adherent upon application of heat, said thermoplastic adhesive having a melting point between substantially 180° and 250° F. and being unaffected or softened by temperatures incidental to the use of an automobile, the porous layer essentially including the adhesive and a filler selected from the group consisting of fibers and clay with the adhesive present in substantially greater volume than the filler and the latter present in amount sufficient to render the layer porous.

HARRY B. DENMAN.